US010885133B1

(12) United States Patent
Maida, IV

(10) Patent No.: US 10,885,133 B1
(45) Date of Patent: Jan. 5, 2021

(54) SEARCH AND RETRIEVAL DATA PROCESSING SYSTEM FOR RETRIEVING CLASSIFIED DATA FOR EXECUTION AGAINST LOGIC RULES

(71) Applicant: TransNexus Financial Strategies, LLC, Austin, TX (US)

(72) Inventor: Joe Maida, IV, Austin, TX (US)

(73) Assignee: TransNexus Financial Strategies, LLC, Austin, TX (US)

(*) Notice: Subject to any disclaimer, the term of this patent is extended or adjusted under 35 U.S.C. 154(b) by 594 days.

(21) Appl. No.: 15/351,168

(22) Filed: Nov. 14, 2016

Related U.S. Application Data

(60) Provisional application No. 62/254,007, filed on Nov. 11, 2015.

(51) Int. Cl.
*G06F 16/9535* (2019.01)
*G06Q 40/00* (2012.01)
(Continued)

(52) U.S. Cl.
CPC .......... *G06F 16/9535* (2019.01); *G06F 16/23* (2019.01); *G06Q 40/00* (2013.01);
(Continued)

(58) Field of Classification Search
CPC ..... G06F 16/9535; G06F 16/23; G06Q 40/00; G06Q 40/12; G06Q 50/265
(Continued)

(56) References Cited

U.S. PATENT DOCUMENTS 5,991,709 A * 11/1999 Schoen .................. G06Q 99/00 704/1
6,643,652 B2 * 11/2003 Helgeson .............. G06F 16/258
(Continued)

OTHER PUBLICATIONS

Garrett Bekker, "Enveil tackles encryption-in-use problem with new take on homomorphic encryption," 451 Research, Apr. 16, 2018, 4 pages.
(Continued)

*Primary Examiner* — Mark E Hershley
(74) *Attorney, Agent, or Firm* — Fish & Richardson P.C.

(57) ABSTRACT

A search and retrieval data processing system for retrieving classified data for execution against a cyber-security logic rules includes one or more hardware processors and memory, networked to communicably couple through a secure connection to a classified data database, the classified data database including an aggregated plurality of classified data records captured from a plurality of classified data sources; and the memory in communication with the processor, the memory storing an execution environment and the execution environment including an input port for receiving, from an entity, data associated with requested operations; a search engine for searching the classified data records of the classified database; and a logic execution module. The logic execution module is operable for executing a set of cyber-security logic rules against the received data and classified data records; and based on a positive comparison between the received data to the classified data records, writing to memory one or more instructions for initiation of one or more termination actions of the one or more requested operations.

26 Claims, 2 Drawing Sheets

(51) Int. Cl.
*G06Q 50/26* (2012.01)
*G06F 16/23* (2019.01)
(52) U.S. Cl.
CPC .............. *G06Q 40/12* (2013.12); *G06Q 50/26* (2013.01); *G06Q 50/265* (2013.01)
(58) Field of Classification Search
USPC ........................................................ 707/706
See application file for complete search history.

(56) References Cited

U.S. PATENT DOCUMENTS

| | | | | |
|---|---|---|---|---|
| 7,072,934 | B2* | 7/2006 | Helgeson | G06F 9/468 709/203 |
| 7,089,583 | B2* | 8/2006 | Mehra | G06F 9/4488 726/3 |
| 7,647,404 | B2 | 1/2010 | Cooper et al. | |
| 8,639,629 | B1* | 1/2014 | Hoffman | G06Q 20/3821 705/67 |
| 8,768,838 | B1* | 7/2014 | Hoffman | G06Q 40/00 705/44 |
| 9,892,465 | B2* | 2/2018 | Love | G06Q 10/10 |
| 2003/0130916 | A1* | 7/2003 | Block | G06Q 40/00 705/35 |
| 2004/0254804 | A1* | 12/2004 | Peterffy | G06Q 40/04 705/26.1 |
| 2004/0254896 | A1* | 12/2004 | Barsade | G06Q 20/10 705/400 |
| 2006/0064313 | A1* | 3/2006 | Steinbarth | G06Q 40/08 705/322 |
| 2006/0085469 | A1* | 4/2006 | Pfeiffer | G06F 16/353 |
| 2008/0214300 | A1* | 9/2008 | Williams | H04L 67/38 463/29 |
| 2009/0240610 | A1* | 9/2009 | Barsade | G06Q 20/04 705/31 |
| 2010/0037324 | A1* | 2/2010 | Grant | G06F 21/554 726/27 |
| 2010/0250497 | A1* | 9/2010 | Redlich | H04L 63/0227 707/661 |
| 2011/0142234 | A1* | 6/2011 | Rogers | G06Q 20/40 380/247 |
| 2011/0166982 | A1* | 7/2011 | Cole | G06Q 40/06 705/37 |
| 2011/0173093 | A1* | 7/2011 | Psota | G06Q 30/06 705/26.35 |
| 2012/0203708 | A1* | 8/2012 | Psota | G06Q 30/06 705/347 |
| 2013/0132275 | A1* | 5/2013 | Enzaldo | G06Q 20/4016 705/44 |
| 2013/0159021 | A1* | 6/2013 | Felsher | G06F 21/6245 705/3 |
| 2013/0246303 | A1* | 9/2013 | Finck | G06Q 40/06 705/36 R |
| 2014/0162598 | A1* | 6/2014 | Villa-Real | G06Q 20/363 455/411 |
| 2014/0180826 | A1* | 6/2014 | Boal | G06Q 30/0245 705/14.66 |
| 2014/0199664 | A1* | 7/2014 | Sadeh-Koniecpol | G06F 21/563 434/118 |
| 2015/0073929 | A1* | 3/2015 | Psota | G06Q 30/0241 705/26.2 |
| 2015/0206143 | A1* | 7/2015 | Kurian | G06Q 20/3823 705/44 |
| 2015/0206149 | A1* | 7/2015 | Kurian | G06Q 20/38215 705/71 |
| 2016/0012235 | A1* | 1/2016 | Lee | G06K 9/00442 726/25 |
| 2016/0012445 | A1* | 1/2016 | Villa-Real | G06Q 20/353 705/44 |
| 2016/0078245 | A1* | 3/2016 | Amarendran | G06F 21/6218 713/193 |
| 2017/0063883 | A1* | 3/2017 | Franzoni Martinez | H04L 63/107 |
| 2018/0212751 | A1 | 7/2018 | Williams et al. | |
| 2018/0212752 | A1 | 7/2018 | Williams et al. | |
| 2018/0212753 | A1 | 7/2018 | Williams et al. | |
| 2018/0212754 | A1 | 7/2018 | Williams et al. | |
| 2018/0212755 | A1 | 7/2018 | Williams et al. | |
| 2018/0212756 | A1 | 7/2018 | Carr et al. | |
| 2018/0212757 | A1 | 7/2018 | Carr | |
| 2018/0212758 | A1 | 7/2018 | Williams et al. | |
| 2018/0212759 | A1 | 7/2018 | Williams et al. | |
| 2018/0212775 | A1 | 7/2018 | Williams et al. | |
| 2018/0212933 | A1 | 7/2018 | Williams et al. | |
| 2018/0224882 | A1 | 8/2018 | Carr | |
| 2018/0270046 | A1 | 9/2018 | Carr | |
| 2019/0042786 | A1 | 2/2019 | Williams et al. | |

OTHER PUBLICATIONS

Matt Johannessen, "Sharpening the Edge with IoT, ML, and Homomorphic Encryption," Novetta Nexus, Jun. 6, 2019, retrieved from <https://www.novetta.com/2019/06/sharpening_the_edge/>, 7 pages.

* cited by examiner and the resulting activity described above. They must remain vigilant and informed with respect to recognizing transactions indicative of terrorist or criminal activity. As part of "Know Your Customer" (KYC) requirements, entities must collect unique identifying information (identifiers) on prospective clients (and sometimes parties to transactions) such as name, date of birth, address, associated business, etc. However, government agencies are frequently unable to share with them vital information (e.g., sometimes specific names, identifiers, trends, or typologies) needed to fully recognize this illegal criminal/terrorist activity due to prohibitions on divulging information that is not readily available to the public. Federal intelligence classifications, sen-
SEARCH AND RETRIEVAL DATA PROCESSING SYSTEM FOR RETRIEVING CLASSIFIED DATA FOR EXECUTION AGAINST LOGIC RULES

CROSS-REFERENCE TO RELATED APPLICATION

This application claims priority under 35 U.S.C. § 119 to U.S. Provisional Patent Application Ser. No. 62/254,007, filed on Nov. 11, 2015, and entitled "Cyber-Security Systems and Methods," the entire contents of which are incorporated by reference as if fully set forth herein.

TECHNICAL FIELD

This description relates to systems and data structures that are especially adapted to provide data retrieval from data sources distributed in a network.

BACKGROUND

Harmful criminal and terrorist activity is often facilitated utilizing computer based value transfer platforms (VTPs). These may include, but are not limited to software platforms that facilitate the transfer of funds, virtual currencies, securities, or other forms of value. Terrorist networks, organized crime, human trafficking organizations, illicit weapons dealers, and narcotics traffickers often rely on the transfer of funds and other forms of value (e.g., trade-based money laundering or virtual currency) by entities to individuals who carry out violent and other illegal activity that are the objective of their enterprises. As most non-terror criminal networks are driven by monetary gain, they must launder (e.g., disguise) their proceeds in order to fund additional illicit activity as well as enjoy their profits through licit purchases or other means of integrating illicitly derived value into a licit economic system. Entities are prohibited from knowingly engaging in transactions on behalf of individuals perpetrating terrorist or criminal activity. They are also prohibited from accepting the proceeds of criminal activity.

If a transaction does not appear on its face to be illicit, but simply suspicious, entities must report suspicious activity after it occurs to government agencies pursuant to the Bank Secrecy Act and Patriot Act through the filing of a Suspicious Activity Report (SAR). The U.S. Department of Treasury Financial Crime Enforcement Network (FinCEN) serves as the repository for these reports which are required to be filed within 30-60 days after the potentially illicit transaction.

Entity personnel such as those who interface with those transferring and accepting funds are frequently referred to as the "first line of defense" for combatting illicit transactions and the resulting activity described above. They must remain vigilant and informed with respect to recognizing transactions indicative of terrorist or criminal activity. As part of "Know Your Customer" (KYC) requirements, entities must collect unique identifying information (identifiers) on prospective clients (and sometimes parties to transactions) such as name, date of birth, address, associated business, etc. However, government agencies are frequently unable to share with them vital information (e.g., sometimes specific names, identifiers, trends, or typologies) needed to fully recognize this illegal criminal/terrorist activity due to prohibitions on divulging information that is not readily available to the public. Federal intelligence classifications, sensitivity of ongoing criminal investigations, as well as general concerns of sharing information with individuals outside of government agencies or the intelligence community greatly restrict what is shared with entity personnel. The resulting limitation restricts what government agencies are able to share with entity personnel as guidance on what transactions to decline and on what to report as suspicious. This creates an incomplete patchwork of information shared with entities that does not enable a comprehensive monitoring of potential transactions (e.g., financial, business, monetary, or otherwise) conducted by individuals and entities. Very few individuals possess clearances to enable vetting of proposed transactions, resulting in a limited and ad hoc approach to value transaction monitoring. Emerging patterns of criminality, suspicious individuals and groups may only be known to government agencies through classified information.

As a result, terrorist/criminal activity can be unwittingly facilitated through entities unbeknownst to well-intentioned entity personnel resulting in "false negatives" (e.g., when illicit activity is not recognized as such). Where a transaction is detected as suspicious, it may take as long as 30-60 days for government agencies to become aware of it—after it and the enabled illicit activity has already occurred. This timeframe presents a potentially fatal flaw to efforts to prevent and investigate the activity. Due to the uncertainty surrounding what constitutes suspicious activity, entity personnel may tend to err on the side of filing SARs resulting in a large volume of "false positives" (e.g., when licit activity is mistakenly suspected to be illicit). False positives tend to inundate government agencies and bog down SAR review teams seeking to prioritize investigations.

SUMMARY

In an example implementation, a search and retrieval data processing system for retrieving classified data for execution against a cyber-security logic rules includes one or more hardware processors and memory, networked to communicably couple through a secure connection to a classified data database, the classified data database including an aggregated plurality of classified data records captured from a plurality of classified data sources; and the memory in communication with the processor, the memory storing an execution environment and the execution environment including an input port for receiving, from an entity, data associated with one or more requested operations; a search engine for searching the classified data records of the classified database; and a logic execution module. The logic execution module is operable for executing a set of cyber-security logic rules against the received data and one or more of the classified data records; and based on a positive comparison between the received data to the one or more classified data records, writing to memory one or more instructions for initiation of one or more termination actions of the one or more requested operations.

In an aspect combinable with the example implementation, the logic execution module is further for modifying one or more classified data records with the one or more instructions.

In another aspect combinable with any one of the previous aspects, the logic execution module is further for integrating with an external system of the entity that provides the received data associated with one or more requested operations; and retrieving the data associated with the one or more requested operations from the external system.

In another aspect combinable with any one of the previous aspects, the logic execution module is further for notifying one or more agencies associated with the classified data.

In another aspect combinable with any one of the previous aspects, the logic execution module is further for based on the notification to the one or more agencies associated with the classified data, enabling an action of the one or more agencies associated with the classified data to override any protocol of notification to the entity with a record of an individual that adjudicates the override.

In another aspect combinable with any one of the previous aspects, the logic execution module is further for terminating the one or more requested operations through the external system of the entity.

In another aspect combinable with any one of the previous aspects, the logic execution module is further for transmitting a notification to the entity associated with the one or more requested operations to terminate the one or more requested operations.

In another aspect combinable with any one of the previous aspects, the logic execution module is further for transmitting a stored record of the submission of the received data of the one or more requested operations for comparison to the entity.

In another aspect combinable with any one of the previous aspects, the one or more termination actions includes a cancelation of the one or more requested operations prior to completion of the one or more requested operations.

In another aspect combinable with any one of the previous aspects, the one or more termination actions includes a warning about the one or more requested operations prior to completion of the one or more requested operations.

In another aspect combinable with any one of the previous aspects, the logic execution module is further for transmitting a message to a government agency regarding the positive comparison.

In another aspect combinable with any one of the previous aspects, the message to the government agency includes at least one of the received data or the classified data.

In another aspect combinable with any one of the previous aspects, the logic execution module is further for comparing an encrypted version of the received data and an encrypted version of the classified data.

In another aspect combinable with any one of the previous aspects, the logic execution module is further for comparing the encrypted version of the financial data with the encrypted version of the classified data with a key without decrypting the data.

In another aspect combinable with any one of the previous aspects, the entity includes a financial institution, a Designated Non-Financial or Professional Business (DNFBP), or another financial conducting business entity.

In another aspect combinable with any one of the previous aspects, the financial institution includes at least one of a bank, savings and loan, investment firm, funds transfer companies, insurance company, securities brokers-dealer, or money services business.

In another aspect combinable with any one of the previous aspects, the DNFBP includes at least one of a casino, dealer in high value items, travel agency, vehicle seller, notary, accountant, auditor, legal firm, investment and commodity advisor, trust and company service provider, real estate company, or non-profit.

In another aspect combinable with any one of the previous aspects, the one or more requested operations includes at least one of an onboarding, a wire transfer, e-cash, purchase of a stored value or pre-paid card, or other form of digital or virtual modes of currency.

In another aspect combinable with any one of the previous aspects, the digital or virtual modes of currency includes Bitcoin, PayPal, or automated teller machines (ATM).

In another aspect combinable with any one of the previous aspects, the received data includes one or more of: a name of a funds sender, a name of a funds receiver, an account number or an internet protocol (IP) address, or other identifying data of the funds sender, an account number of the funds receiver, a name, routing number, or both of an entity associated with the funds sender, or a name, routing number, or both of an entity associated with the funds receiver.

In another aspect combinable with any one of the previous aspects, the classified data includes one or more of: a name of a terrorist or criminal, a proxy for a terrorist or criminal, one or more associates of a terrorist or criminal, financial or other data associated with a terrorist or criminal or any derivative pseudonym of a terrorist or criminal, or financial or other data associated with a terrorist organization or criminal organization or any derivative pseudonym of a terrorist organization or a criminal organization.

In another aspect combinable with any one of the previous aspects, the logic execution module is further for identifying data associated with another requested operation at the entity; comparing the identified data associated with the another requested operation to classified data stored in the secured classified database; and based on a negative comparison between the identified data of the another requested operation to the classified data, initiating an action to purge or delete at least one of the identified data or the classified data.

In another aspect combinable with any one of the previous aspects, the logic execution module is further for based on a negative comparison between the identified data of the another requested operation to the classified data, storing a result of the comparison of the identified data of the another requested operation and the classified data.

In another aspect combinable with any one of the previous aspects, the logic execution module is further for erasing the received data subsequent to the negative comparison.

In another aspect combinable with any one of the previous aspects, the logic execution module is further for erasing the compared classified data subsequent to the comparison.

In another aspect combinable with any one of the previous aspects, the logic execution module is further for updating the classified database based on a change to data stored in one or more classified data sources.

In another aspect combinable with any one of the previous aspects, the logic execution module is further for requesting authorization to compare the received data to the classified data prior to the comparison.

In another aspect combinable with any one of the previous aspects, the logic execution module is further for receiving an override message from a government agency to discontinue the termination action of the one or more requested operations; receiving an identification of an adjudicator of the override message.

In another aspect combinable with any one of the previous aspects, the logic execution module is further for comparing data in the secure classified database with a calibrated disclosure in order to overcome data sharing challenges caused by prohibitions of intelligence sharing between countries or entities where human dialog and sharing of information is prohibited.

In another aspect combinable with any one of the previous aspects, the logic execution module is further for creating a secured unclassified database that includes the received data.

In another aspect combinable with any one of the previous aspects, the logic execution module is further for aggregating received data associated with a plurality of requested operations; comparing the aggregated received data to the classified data stored in the secure classified database; and based on one or more positive comparisons between the aggregated received data and the classified data, determining one or more trends or typologies of illicit activity.

In another aspect combinable with any one of the previous aspects, the secured unclassified database includes received data from an external system of the entity, and the logic execution module is further for creating a second secured unclassified database with received data independent of the external system of the entity for comparison to the classified data.

In another aspect combinable with any one of the previous aspects, each of the received data aggregated in the secured unclassified database includes data previously-compared against the classified data with no positive comparison.

In another aspect combinable with any one of the previous aspects, the logic execution module is further for creating the secured classified database with the classified data sourced from a plurality of classified data sources, each classified data source associated with a particular government agency.

In another aspect combinable with any one of the previous aspects, the secured classified database includes a plurality of separately maintained data stores, each data store corresponding to a particular government agency.

In another aspect combinable with any one of the previous aspects, the logic execution module is further for defining a plurality of categories based on a gravity of predicted harm or threat to public safety as a result of a completion of the one or more requested operations.

In another aspect combinable with any one of the previous aspects, the logic execution module is further for determining, based on a positive comparison, that the one or more requested operations falls within a first category; and based on the determination, performing at least one action including terminating the one or more requested operations through integration with the external system of the entity; notifying only the entity to terminate the one or more requested operations; notifying only one or more government agencies; or notifying both the entity and the one or more government agencies.

In another aspect combinable with any one of the previous aspects, the logic execution module is further for determining, based on a positive comparison, that the one or more requested operations falls within a second category; and based on the determination, performing at least one action including notifying only the entity to terminate the one or more requested operations; notifying only one or more government agencies; notifying both the entity and the one or more government agencies.

In another aspect combinable with any one of the previous aspects, the logic execution module is further for receiving, from the one or more government agencies, indication to override initiation to terminate the one or more requested operations; and recording the decision to override initiation to terminate the one or more requested operations and an identifier of an adjudicator at the one or more government agencies that provided the override.

In another aspect combinable with any one of the previous aspects, the logic execution module is further for determining, based on a negative comparison, that the one or more requested operations falls within a third category; and based on the determination, performing at least one action including storing a record of submission of the received data for the one or more requested operations for comparison; maintaining the compared data for further comparison at a later time period; or purging the compared data of the one or more requested operations from memory.

Various implementations of a VTP monitoring system according to the present disclosure may include one, some, or all of the following features. For example, imminent terrorist and criminal activity enabled by VTPs may be prevented through real-time comparison of KYC or other transaction data (e.g., financial or value data) collected by entities to classified databases of criminal or terrorist suspects and illicit networks. This comparison result may be communicated exclusively to the agency submitting the intelligence or their designated agent and then potentially be shared with entities in a deliberate manner—to balance the need for public safety with that of additional investigation and network mapping.

Criminal or suspicious activity may be monitored by government agencies to obtain better visibility on illicit activity and "build out" these networks by identifying additional proxies and facilitators not known at the time of the original transaction. The resulting increased optic on transactions will also better enable the identification of other more opaque participants in transactions such as true beneficial owners and illicit shell companies. Where a transaction is suspected to be intended to enable imminent harm to society, it can be declined and the potential threat prevented. Where imminent harm is not suspected, government agencies and intelligence agencies will be able to more strategically monitor, degrade, and neutralize these networks through investigation, prosecution, and targeting where appropriate. Entities will be less compelled to erroneously deny transactions, de-risk and off-board classes of individuals based on type of business activity or locale/venue. Greater freedom to conduct licit cross-border transactions will result based on the ability to better discern illicit actors and transactions.

Various implementations of the inventions described in the present disclosure may include computer-implemented methods, hardware computing systems, and computer readable media. For example, a system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The details of one or more embodiments are set forth in the accompanying drawings and the description below. Other features, objects, and advantages will be apparent from the description and drawings, and from the claims.

DETAILED DESCRIPTION

Figure 1:
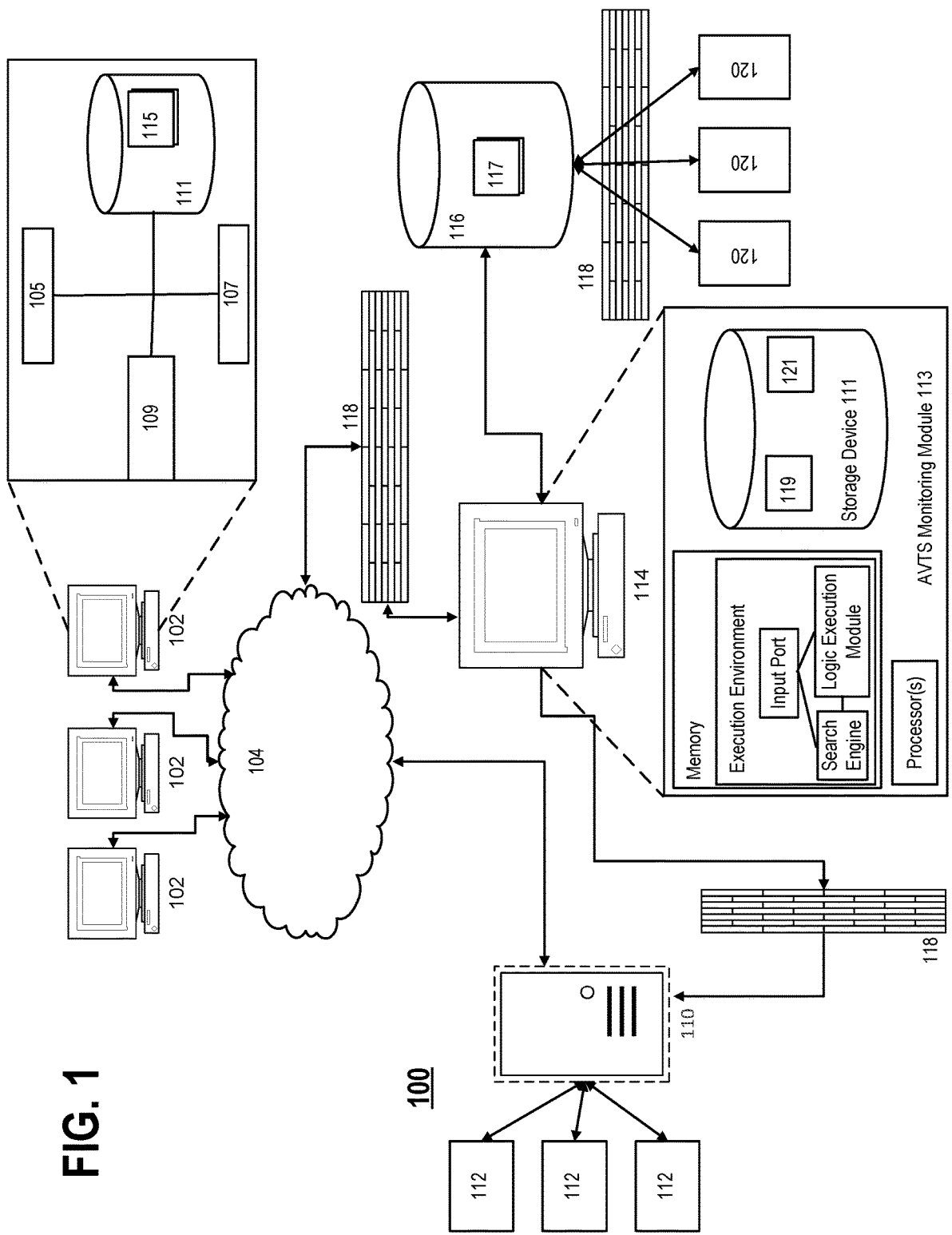
FIG. 1 illustrates an example distributed computing system including a computer-executable VTP monitoring system that identifies as well as better enables interdiction and investigation of illicit transactions.

The present disclosure describes VTP monitoring systems, methods, apparatus, and processes that identify, as well as enable, interdiction and investigation of illicit transaction (e.g., money laundering and other illicit financial transactions). The term "money laundering" as used herein refers not only to currency as a medium of exchange, but virtual currency, securities, and any other form of illicit value transfer. In the context of this disclosure, the term "anti-money laundering" may include what is commonly referred to as "reverse money laundering" where terrorist or criminal activity is facilitated, supported, or enabled by providing anything of value utilizing a computer based VTP. Embodiments of the present disclosure may, at least in part, compare identifying data of prospective clients or those seeking to transfer value, recipients of value, and other transaction identifiers to a classified database populated by government agencies and intelligence communities for use by VTP monitoring and security systems and methods. Embodiments of the present disclosure may also compare, consistent with the existing dynamic of the legal reporting obligations under the Bank Secrecy Act and Patriot Act, prospective clients, recipients of funds, and other transaction identifiers recipient account numbers to classified non-public databases populated and/or maintained by government agencies and intelligence communities for use by the VTP monitoring systems and methods. Parameters of comparison and notification will be capable of recalibration to reflect potential changes in the legal reporting obligations of entity personnel. The present disclosure is a system to monitor and integrate with computer-based VTPs. It is hereinafter referred to as a VTP monitoring system.

As the term "securities" is used herein, it is defined to include, but is not limited to equities, mutual funds, money market mutual funds, bonds and similar debt instruments, foreign exchange contracts, and certificates of deposit. "Entity" as this term is used herein refers to those in the business of transferring value including but not limited to a bank, savings and loan, investment firm, funds transfer companies (e.g., Western Union), insurance companies, securities brokers-dealers, and money services businesses (e.g., Hawalas, Casos de Cambio) and those operating virtual currency exchange platforms as well as automated teller machine systems and software. "Entity" as this term is used herein refers also to Designated Non-Financial Businesses and Professionals (DNFBPs) to include casinos and other legitimate gaming enterprises, dealers in high value items (e.g., jewelers, precious metals, art, etc.), travel agencies, vehicle sellers (e.g., cars, boats, aircraft), notaries, accountants, auditors, lawyers, investment and commodity advisors, trust and company service providers, real estate companies, and charities or other non-profit organizations. It may also include other VTP exchange platform operators and others transferring value utilizing a software-based computer platform. The term "classified data," as it is used herein, may be data to which only government agencies (e.g., law enforcement, intelligence, or military) have access, and that which is not lawfully available to the general public. This includes any information whose access is controlled by a government entity to include intelligence classified in levels such as Top Secret to Confidential, as well as sensitive government agency information. The VTP monitoring system may include the ability to integrate with existing entities' transaction software to capture and compare all transaction data fields to the secure, classified database populated by government agencies. Alternatively, the VTP monitoring system may also contain a similar database populated by entities for comparison on an ad-hoc basis, such as for the purposes of on-boarding clients where no transaction is proposed. This may enable real-time comparison to classified databases of suspicious individuals, known criminal/terrorist actors and accounts which are unable to be shared with the public.

Embodiments of the present disclosure may include systems or methods in which disclosure of the results of the comparison may be calibrated depending on the type of "hit", if any, as detailed further below. This includes names of individuals, entities, accounts, and other identifiers (such as phone numbers, physical addresses, dates of birth, and Social Security numbers) which cannot be shared with the public. This secure information held by government agencies and intelligence agencies and submitted into a secure database for comparison may be classified as confidential, government agency sensitive, USGOV Secret, USGOV Top Secret, and USGOV Top Secret/Sensitive Compartmentalized Information. The VTP monitoring system may have a continuum of categories of RED, YELLOW, and GREEN that reflect the gravity of harm predicted by a transfer of funds to the individual or entity. This categorization may be done, in some embodiments, by the submitting agency. Each submitting agency may be able to maintain separate secure classified databases if they so determine. Embodiments of the present disclosure may also compare transaction data or identifiers against several independently firewalled databases concurrently to prevent against comingling of data submitted by different government agencies. The comparison may involve comparing submitted transaction data or identifiers against the secure database that include names, as well as derivative pseudonyms, of suspected terrorists or other criminals. The VTP monitoring system may filter submitted data based on categories of risk that may trigger notifications to the submitting entity and the government agencies or intelligence agency. Embodiments of the present disclosure may also utilize comparison and notification parameters that are capable of recalibration to reflect legal changes to entity reporting obligations and sharing of information/intelligence.

Embodiments of the present disclosure may notify government agencies and/or intelligence officials when there is a "hit" or positive comparison (e.g., match) of the name, entity, account number, or other identifiers submitted by the institution, to one contained in the secure database. To prohibit carte blanche disclosure of private transaction and client data to government agencies, there may be no notification to government agencies where there is not a "hit" or positive comparison (e.g., match) as further described.

One category may be the RED class. This is a category of potential transaction which completion poses an imminent threat to public safety. One such example might be onboarding a client or transferring money to a known terrorist or criminal, suspected terrorist or criminal, or associate whose terrorist or criminal status is known only to government agencies. Public safety warrants the interruption of this transaction, and the VTP monitoring system (e.g., integrated with a system of the entity) may enable termination of the transaction and/or immediate notification to entities to not complete this transaction. The VTP monitoring system may enable notification only to the submitting agency first, who can then determine whether to notify the entity as detailed further below. The notification communicated exclusively to the agency submitting the intelligence for comparison government agencies can then potentially be shared with entities in a deliberate manner—to balance the need for public safety with that of additional investigation and network mapping.

Another class will be the YELLOW class. This category raises suspicions but there is no apparent imminent threat to public safety. The software will enable the entity to be notified of the suspicious nature of the transaction so that they may file a SAR to enable further investigation. The software will also enable notification only to the submitting agency first.

Finally, there is the GREEN class where there is no positive comparison to identifiers in the secure database, and no apparent suspicions or concerns are raised. The security system will protect the identifying data and transaction details with negative results from disclosure to government agencies. However the software may retain a record of submissions and results in this category to document entity due diligence and enable VTP monitoring system integrity testing.

Government agencies will have the ability to override the RED and YELLOW system notifications to the entities where there is a decision to permit the transaction in the interest of further investigation. The VTP monitoring system may record this decision and the individual adjudicator of the decision. For example, it may be beneficial to monitor the transaction in coordination with broader government agency surveillance capacities to "build out" criminal or terrorist networks and "connect the dots" further. The same would hold true for other types of criminal activity commonly facilitated through entities such as laundering the proceeds of corruption, fraud, counterfeiting, human trafficking, black market energy resources, and luxury items. This will enable more effective identification of unknown proxies and conduits of individuals on sanctions lists and Specifically Designated Global Terrorists. It will also enable better identification of linkages between networks who may briefly coalesce for a common enterprise but whose conduits, facilitators, designs or scheme are known only to government agencies. One such example is trade based money laundering related to vehicles where narco and terror elements coordinated for common interests. Another example is the coordination between narco and human trafficking in U.S. border regions. This will enable a more strategic approach to dismantling complex criminal and terrorist networks. It will also enable government agencies to be more proactive in nature through identifying and interdicting emerging trends known only to government agencies before harm to the public is manifested. The software may retain a record of submissions and results in the RED and YELLOW categories to enable VTP monitoring system integrity testing or for any other legitimate purpose.

The VTP monitoring system will not relieve the entity of its obligation to be vigilant and recognize suspicious activity. Rather, the VTP monitoring system may be considered another tool for entities in balancing risk against foregoing certain value transfer opportunities altogether. It also promotes and reinforces a culture of compliance where there may be reluctance to file a SAR out of concern for foregone economic benefit to the entity.

This template of matching known names to secure databases with calibrated disclosure may also be used to overcome data sharing challenges caused by prohibitions of intelligence sharing (e.g., caveats) between countries or entities such as INTERPOL and international Financial Intelligence Units. Later development will also cover trend analysis.

For example, implementation of the security system may perform operations that include capturing identifying data associated with a transaction; comparing the identified transaction data to classified data previously input into a secure database; and based on a positive comparison between the submitted transaction data to the input classified data, enable actions to terminate transaction and investigate those attempting to perpetrate it.

In some aspects, as described herein, embodiments of the VTP monitoring system may be employed consistent with, and are consistent with, the existing dynamic of the legal reporting obligations of entities to report illegal or suspicious activity to government agencies pursuant to obligations under the Bank Secrecy Act, Patriot Act and other statutes. However, the module enables a stark departure from existing industry practice of utilizing only unclassified information to inform day-to-day decisions by entity personnel using VTPs. This module represents a dramatic improvement in the ability to detect illicit transactions by comparing identifying data on prospective clients and recipients of funds to classified databases maintained by government agencies and intelligence communities. Embodiments may enable real-time comparison to classified databases containing identifying data on suspicious individuals, known criminal/terrorist actors and accounts. This includes identifying data classified as confidential, government agency sensitive, USGOV Secret, USGOV Top Secret, and USGOV Top Secret/Sensitive Compartmentalized Information maintained by government agencies and intelligence agency databases. Embodiments of the VTP monitoring system may filter submitted data based on categories of risk that trigger notifications to the submitting entity and the government agencies or intelligence agency. This classification, in some aspects, may be done by government agencies.

In bandwidth constrained networks, detection of these false positives consumes computing resources and triggers a chain of actions that cause an increase in network traffic (as alerts and other messages are sent). Using the techniques described herein, detection is more precise, which results in fewer false positives. This in turn, results in a decrease in resources consumed and network traffic.

Additionally, the real-time access to this classified data provides for real-time or instantaneous generation of the "instructions," as the data is received over the input port, which provides for increased flexibility in analyzing the data and in generating appropriate instructions. This is an improvement over conventional ways of evaluating these kinds of requested operations. For example, very few entity personnel have clearances to classified data, resulting in limited sharing of intelligence by government agencies with entity personnel. Entity VTPs operate in a manner largely uninformed by classified data, instead relying on public databases. Similarly, government personnel are restricted from access to routine entity financial data (in the absence of particularized suspicion). In the conventional ways, comparison of entity transaction data and identifiers to classified data has to be performed on an ad hoc basis at specified time intervals with limited access by those with clearances. This results in limited, non-real time detection of unauthorized operations (illicit VTP transactions), which in turn resulted in a substantial increase in latency of detection of these unauthorized operations. Using the techniques described herein, the secure connection to a classified data database provides for a decrease in latency in detecting these unauthorized operations and provides for more instantaneous detection and subsequent flexible modification of data records (including termination instructions) and/or generation of the instructions themselves. The techniques described herein also enable integration with VTP transaction software to enable interrupting the transaction.

Further, enabling user manipulation of large amounts of data from multiple data sets and relating disparate factors to identify extraordinary objects can require large amounts of memory and processing cycles. Considering each dimension of a database individually may reveal only modest differences between relative targets. Yet as disparate factors are related to one another and as a user is allowed to change analytic criteria in real time across large volumes of data, an administrator may be able to perceive a degree of persistency of desirable characteristics while also recognizing the relative suitability, oftentimes diminished, of other targets as the criteria and dimensions are modified. This persistency may become even more compelling when three or four dimensions of consistency are considered and an administrator is allowed to perceive targets of interest whose ordinal metric, under new criteria, may not surface into a display of top targets but for a user designation to maintain selected objects within a data view of legacy targets under the new criteria. While advances in computer technology have greatly increased the amount of available information, the sheer volume of information can be overwhelming and cumbersome to the extent that processors may struggle to operate on data sets in time such that a user can perceive the impact of new criteria in real-time. In some configurations, real-time is defined as the time required to maintain a TCP connection across a wide area network. In other configurations, real-time is defined as the ability to render a new display within a threshold degree of time (e.g., 1 second, 3 seconds, or 10 seconds). By configuring the database to perform preprocessing in a way that facilitates real-time updates to a display, the user is provided with an investigative and preemptive tool that allows multidimensional target investigation in a manner capable of allowing a user to perceive the impact of a particular factor on relative performance.

FIG. 1 illustrates an example distributed computing system 100 including a computer-executable VTP monitoring module 113 that identifies potentially illicit transactions through comparison of entity data with suspicious individuals and entities. This enables the detection and prevention of money laundering by exclusively notifying government agencies of "hits" or instances of positive comparisons (e.g., matches) with classified individuals, networks, and typologies. The distributed system 100, in some aspects, may receive or identify requests for comparison of data related to transactions (e.g., onboarding, wire transfers, e-cash, stored value or pre-paid cards, Internet-based payment servers such as PayPal, securities transaction, or virtual currency transaction and other transactions that involve a transfer of value) from an entity. For example, an entity may include a bank, savings and loan, investment firm, funds transfer companies (e.g., Western Union), insurance companies, securities brokers-dealers, and money services businesses (e.g., Hawalas, Casos de Cambio). DNFBPs include, for example, casinos and other legitimate gaming enterprises, dealers in high value items (e.g., jewelers, precious metals, art, etc.), travel agencies, vehicle sellers (e.g., cars, boats, aircraft), notaries, accountants, auditors, lawyers, investment and commodity advisors, trust and company service providers, real estate companies, and charities or other non-profit organizations.

The module will also interface with other digital and virtual modes of currency such as Bitcoin, as well as automated teller machine systems and software.

As illustrated in this example implementation, the VTP monitoring module 113 includes a memory that includes an execution environment, a storage device 111 (e.g., a database, computer readable media, or other memory module), and one or more processors. The execution environment can be hosted on one or more specially programmed computers under the control of a suitable operating system, such as UNIX, OS, Windows, Android, or otherwise. For example, the execution environment can include a multiple-node parallel computing environment: this can include configuration of computer systems using multiple central processing units (CPUs); either local (e.g., multiprocessor systems such as SMP computers) or locally distributed processors (e.g., multiple processors coupled as clusters or MPPs); remote or remotely distributed processors (e.g., multiple processors coupled via a local area network (LAN) and/or wide-area network (WAN)); or any combination thereof.

The execution environment shown on the VTP monitoring module 113 includes an input port that is communicably coupled with a search engine and a logic execution module. The search engine may include, for example, software components, hardware components, or a combination of both, that facilitate search and retrieval of data stored both in memory and to disk. The input port manages and/or receives input received from a user over a user interface (e.g., a graphical view on a display screen) or input devices. The logic execution module includes software components, hardware components, or a combination of both, that execute executable logic (e.g., source code and other computer instructions).

The example system 100 shown in FIG. 1 includes entities 102. Each entity 102 is represented by a computing system into which details of proposed or requested transactions are provided. Entities 102 are in electronic communication with: FinCEN 110 (or other similar government agency), and VTP monitoring system 114 (e.g., a search and retrieval data processing system for retrieving classified data for execution against a cyber-security logic rules) through a network 104. The VTP monitoring system 114, as explained more fully herein, may access a classified database 116 to compare transaction data to classified data (e.g., identifiers of terrorists and terrorist organizations, criminals and criminal organizations, aliases, suspected terrorists and criminals, criminal and terrorist financial information, and otherwise). As the compared data matches or substantially matches, the VTP monitoring system 114 may alert FinCEN 110 (or another government agency, or both), which can then make a decision to alert one or more of the entities 102 to prevent, delay, or otherwise identify an illicit transaction based on the positive comparison (e.g., match). Conversely, FinCEN 110 may decide to not notify the entity 102 and permit the transaction to be facilitated for the purpose of, e.g., sustained monitoring or additional investigation of the illicit activity that is suspected to be underway.

Network 104 facilitates wireless or wireline communications between the components of the system 100, as well as with any other local or remote computer, such as additional clients, servers, or other devices communicably coupled to network 104 but not illustrated in FIG. 1. The network 104 is illustrated as a single network in FIG. 1, but may be a continuous or discontinuous network without departing from the scope of this disclosure, so long as at least a portion of the network 104 may facilitate communications between senders and recipients. The network 104 may be all or a portion of an enterprise or secured network, while in another instance at least a portion of the network 104 may represent a connection to the Internet. In some instances, a portion of the network 104 may be a virtual private network (VPN). Further, all or a portion of the network 104 can comprise either a wireline or wireless link. Example wireless links may include 802.11a/b/g/n, 802.20, WiMax, and/or any other appropriate wireless link. In other words, the network 104 encompasses any internal or external network, networks, sub-network, or combination thereof operable to facilitate communications between various computing components inside and outside the illustrated system 100. The network 104 may communicate, for example, Internet Protocol (IP) packets, Frame Relay frames, Asynchronous Transfer Mode (ATM) cells, voice, video, data, and other suitable information between network addresses. The network 104 may also include one or more local area networks (LANs), radio access networks (RANs), metropolitan area networks (MANs), wide area networks (WANs), all or a portion of the Internet, and/or any other communication system or systems at one or more locations.

Each entity 102, as shown, includes a computing system that includes an interface 105, a processor 107, and storage device 111. As used herein, an interface 105 is used by a computing device (e.g., entities 102, VTP monitoring system 114, and otherwise) for communicating with other systems in the distributed system 100 connected to the network 104, as well as other systems not shown in FIG. 1. Generally, the interface 105 comprises logic encoded in software and/or hardware in a suitable combination and operable to communicate with the network 104. More specifically, the interface 105 may comprise software supporting one or more communication protocols associated with communications such that the network 104 or interface's hardware is operable to communicate physical signals within and outside of the illustrated system 100.

As used herein, a processor such as processor 107 may be two or more processors according to particular needs, desires, or particular embodiments of system 100. Each processor 107 may be a central processing unit (CPU), a blade, an application specific integrated circuit (ASIC), a field-programmable gate array (FPGA), or another suitable component. Generally, the processor 107 executes instructions and manipulates data to perform the operations of software stored in memory of the particular computing device (e.g., entity 102, system 114, or otherwise) on which it is located, or software stored on another communicably coupled device.

For example, as shown in FIG. 1, VTP monitoring system 114 includes software including a VTP monitoring module 113, while one or more entities 102 include software including a VTP monitoring plug-in 109. Regardless of the particular implementation, "software" may include computer-readable instructions, firmware, wired or programmed hardware, or any combination thereof on a tangible medium operable when executed to perform at least the processes and operations described herein. Indeed, each software component may be fully or partially written or described in any appropriate computer language including C, C++, Java, Visual Basic, assembler, Perl, any suitable version of 4GL, as well as others. It will be understood that while portions of the software illustrated in FIG. 1 are shown as individual modules that implement the various features and functionality through various objects, methods, or other processes, the software may instead include a number of sub-modules, third party services, components, libraries, and such, as appropriate.

As used herein, a memory such as storage device 111 may include any memory or database module and may take the form of volatile or non-volatile memory including, without limitation, magnetic media, optical media, random access memory (RAM), read-only memory (ROM), removable media, or any other suitable local or remote memory component. Storage device 111 may store various objects or data, including, without limitation, data associated with transactions and otherwise.

As illustrated in FIG. 1, transaction data 115 may be stored (at least for a transitory time period) in storage device 111 of the entities 102. Transaction data 115 (e.g., financial transaction data) may include, for example, names of a funds sender (an entity that supplies funds) and funds receiver (an entity that receives or gains access to the funds), an account information of the funds receiver. Identifying data such as account information, name, date of birth, address, and social security number of the funds sender, name of sending entity or business, name of receiving entity or business, routing number of the sending entity, and name, date of birth, address, social security number, and routing number of the receiving instruction may also be part of transaction data 115. Where no positive comparison is found, the transaction data is purged, deleted other otherwise removed but alternatively may also be retained for legitimate purposes as previously explained.

For example, entities routinely capture data during the normal course of business in transferring funds from one person or entity to another (e.g., the data 115). Entities (e.g., financial institutions) may use transaction software that requires fields of data to be populated with information that is unique to each transaction. These fields may include but are not limited to identifiers such as name, address, date of birth, telephone number and social security number for the recipient of the funds. (Note that this data is already on file in the event that the sender is a client.).

As described herein, should the entity 102 determine that a transaction raises suspicion, the entity 102 may still complete the transaction and file a SAR. The SAR may be communicated to FinCEN 110, and its content to other entities, such as government agencies 112 (e.g., FBI, CIA, foreign agencies, law enforcement). FinCEN 110 also utilizes commercial SAR analytic software to enable it to prioritize the investigation of SAR filings, e.g., by using typology identification, trend analysis, and otherwise. But as noted herein, the SAR process is hindsight focused and historical in nature, as the government agencies' optic on the illicit transactions is restricted to those reported by entity personnel with limited knowledge, sometimes 30-60 days after the suspected illicit transfer. Government agencies 112 are also limited in their ability to "build out" networks and "connect the dots" of illicit activity that may include common individuals, methods of criminality, and linkages between the underlying illegal conduct (e.g., the narco-terror nexus). VTP monitoring system 114, however, can enable real-time or reduced latency comparison of transaction data (e.g., financial transaction data) with classified data stored in a secure classified database while also preserving security (e.g., confidentiality) of the transaction data, neither of which exists in the conventional SAR process. For example, as noted, the SAR process may not be completed in time to stop or slow a requested or proposed transaction that is illicit. Further, to the extent the SAR process (or any comparative process of transaction data to unclassified data) utilizes human comparison of such data, division or separation of knowledge of both the transaction data (which may be personal data) and the classified data (which is governmentally-controlled) may be difficult if not impossible. For example, currently, comparison of proposed entity transaction data is limited to public data bases. Few entity personnel have security clearances that enable government agencies to share classified intelligence related to suspected criminal or terrorist individuals and groups. Similarly, government personnel are prohibited from viewing entity data related to routine proposed transactions. In the absence of a computer based module described herein, real-time comparison of the protected transaction data to classified information is not possible.

Concurrent with, in addition to, or alternatively, the VTP monitoring system 114 may identify, capture, or receive the data 115 from the entity 102 during (e.g., in real-time or near real-time) a transaction at the entity 102. For example, the VTP monitoring plug-in 109 may work in or with existing transaction software (e.g., transaction monitoring software systems) to identify, capture, or receive the data 115 from the entity 102.

The captured or received data 115 may be sent to or exposed to the VTP monitoring module 113 on the VTP monitoring system 114 for comparison against classified data 117 in the classified database 116. As used herein, "classified" data includes information which access is governmentally controlled and legally viewable only by individuals with government authorization (e.g., government clearance and/or law enforcement). As shown, in this example, the classified database 116 may be securely separated from classified sources 120 (e.g., no fly list, USGOV Secret, USGOV Top Secret, and USGOV Top Secret/Sensitive Compartmentalized Information maintained by government agency and intelligence agency databases, and otherwise).

In some aspects, the classified database 116 may be created or generated as a new classified database 116 where none existed (or exists) prior to creation by the process disclosed herein. For example, the VTP monitoring system 114 may create or include a new classified database 116 from the (independent) classified data sources 120 where classified data in such sources have not been previously collected, aggregated, or organized in a classified database 116.

In this example, firewall 118 separates the classified database 116 from the classified sources 120, thereby ensuring that the classified sources 120 are protected from unauthorized access, hacking, leaks, or otherwise. In this example, the classified database 116 may be part of the VTP monitoring system 114 and dynamically updates the classified data 117 based on changes (e.g., additions, deletions, etc.) to information in the classified sources 120. In alternative implementations, an additional firewall may separate the VTP monitoring system 114 and the classified database 116. In some examples, the classified database 116 may be controlled by the same entity that controls the VTP monitoring system 114. In some examples, the classified database 116 may be controlled by another entity (e.g., government or otherwise) different than that controlling the VTP monitoring system 114.

The VTP monitoring module 113 compares the data 115 and the classified data 117. For example, names or account numbers of funds senders and/or funds receivers may be compared to names and other identifying data of known criminals or terrorists (or their proxies). An output of the comparison may result in or more of several actions. For example, the VTP monitoring module 113 may filter the comparison data based on categories of risk that trigger notifications to the submitting entity 102, as well as government agencies or intelligence agencies that supplied the classified source 120 from which the matched data was provided. One category may be a "high risk" (or "RED") category. This is a category of potential transaction whose completion poses an imminent threat to public safety. One such example might be onboarding a client or transferring money to a known terrorist, suspected terrorist, or associate whose status and/or identity is classified or not publicly available. Public safety warrants the interruption of this transaction and the VTP monitoring module 113 may notify the entity 102, FinCEN 110, or both (or others as well) to discontinue the pending transaction. This additional information of the transaction, such as the data 115, may, in some cases, be legally prohibited from public disclosure. There may only be notification to government agencies, which can then decide whether to notify the entity 102 to deny the transaction.

In addition, the VTP monitoring module 113 may automatically contact one or more governmental agencies (e.g., the law enforcement, intelligence, or military) responsible for the particular classified source 120 from which the matched data originated. The VTP monitoring module 113 may also provide the matching identifying criteria (e.g., the data 115, or other data sharing specific commonality between the submitted data and classified data).

In some aspects, the storage device 111 of the VTP monitoring system 114 may include a secure database containing unclassified information 119. In some aspects, for example, data 115 that has been received or captured from multiple proposed transactions at the entities 102 may be aggregated and stored in the unclassified secure database 119. In some aspects, such aggregated data may be data 115 that, individually, has no positive comparison (e.g., match) with classified data 117 (e.g., a GREEN scenario). But as aggregated data, compared (e.g., periodically or otherwise) to the classified data 117, it may reveal positive comparisons (e.g., a RED or YELLOW scenario) to classified typologies or patterns of illicit monetary activity known only to government agencies. Further, positive comparisons (e.g., matches) between the aggregated data and the classified data 117 may reveal trends or other typologies that reveal or are consistent with illicit transactions. Such trends or typologies may be communicated from the VTP monitoring system 114 to, e.g., FinCEN 110, the classified data sources 120, or other government agencies, as well as, the entities 102. Otherwise the aggregated data will not be revealed to government agencies in the absence of a lawful purpose. The VTP monitoring module 113 may also be capable of integration with existing commercial software that identifies typologies and applies algorithmic analysis.

In some aspects, the storage device 111 of the VTP monitoring system 114 may include another secure database 121. In some aspects, for example, unclassified database 121 may be populated by entities 102 for comparison on an ad-hoc basis, such as for the purposes of on-boarding clients of entities 102 where no transaction is proposed. The data stored in unclassified database 121 may be compared to classified data 117 in such instances.

In this example, firewalls 118 may isolate the classified data 117, as well as classified or non-public data stored at the government agencies 112 and/or FinCEN 110, from the VTP monitoring system 114 to ensure that privacy concerns (e.g., on the part of the entities 102 or otherwise) are met. For example, the firewalls 118 (e.g., any hardware or software that requires security and/or authentication to access therethrough) may ensure or help ensure that classified data 117 is not released to the public or vulnerable to cyber-attack/breach (e.g., those without clearance to view such data), through the VTP monitoring system 114 or otherwise. In some aspects, each of firewalls 118 is a network security system that monitors and controls the incoming and outgoing network traffic based on predetermined security rules (e.g., provided by FinCEN 110, the VTP monitoring system 114, the classified data sources 120, the entities 102, or otherwise).

Another category may be a "medium risk" (or "YELLOW") category. This category of positive comparison (e.g., match) raises suspicions of illicit activity, but may not indicate or warrant an apparent imminent threat to public safety. The entity 102 or FinCEN 110 (or both) is notified (e.g., automatically by the VTP monitoring module 113 or plug-in 109) to enable further investigation. Upon receipt of a notification of a YELLOW category by the VTP monitoring module 113, an override notification can be provided to the VTP monitoring module 113 (or alternatively, directly to the entity 102) from, for example, a government agency 112, a classified data source 120, both, or other notification source.

Another category may be a "no apparent risk" (or "GREEN") category where there is no positive comparison (e.g., match) of submitted identifying criteria to the secure database. The data 115 used in the comparison (e.g., names of these individuals and their account numbers) are discarded by the VTP monitoring module 113 and are not disclosed to government agencies consistent with the existing dynamic where licit transactions are confidential and not shared with government agencies. Alternatively, a comparison of the data may be retained for a record of due diligence or system integrity testing.

In some examples, the data 115 and/or the classified data 117 may be encrypted (e.g., by the VTP monitoring module 113 or otherwise). For example, the classified data 117 in the classified database 116 may be (e.g., at all times) encrypted so that no "clear text" version of the data exists outside of the classified sources 120 and, in some cases outside of the classified database 116. Thus, in some examples, the comparison of the data 115 and the classified data 117 may be a comparison of encrypted data 115 and encrypted classified data 117. In other examples, each encryption will take place in different modalities with another coded intermediary to decipher and compare the underlying common alphabet characters and Arabic numerals. In alternative aspects, for example, when another firewall is positioned between the VTP monitoring system 114 and the classified database 116 (or a computing system that includes the classified database 116), unencrypted data 115 may be compared to unencrypted classified data 117.

In some aspects, the determination of a particular category by the VTP monitoring module 113 may be overridden, e.g., by a government agency. For example, a government agency, upon receipt of a notification of such category (e.g., RED or YELLOW) by the VTP monitoring module 113, can provide an override notification back to the VTP monitoring module 113 (or alternatively, directly to the entity 102). For example, the government agency may determine that the transaction should be permitted in the interest of further investigation. In some aspects, the VTP monitoring module 113 may capture that decision (e.g., to allow the transaction to proceed to completion) and the identity of the adjudicator of that decision.

For example, it may be beneficial to monitor the transaction in coordination with broader government agencies' surveillance capacities to "build out" criminal or terrorist networks and "connect the dots" further. The same would hold true for other types of criminal activity commonly facilitated through entities such as laundering the proceeds of corruption, fraud, counterfeiting, human trafficking, black market energy resources, and luxury items. This will enable more effective identification of unidentified, classified names of proxies and conduits of individuals on publicly available sanctions lists and Specifically Designated Global Terrorists. It will also enable better identification of linkages between networks who may briefly coalesce for common enterprise. One such example is trade based money laundering related to vehicles where narco and terror elements coordinated for common interests. Another example is the coordination between narco and human trafficking in U.S. border regions. This will enable a more strategic approach to dismantling complex criminal and terrorist networks. It will also enable government agencies to be more proactive in nature through predictive analysis—identifying and interdicting emerging trends before harm to the public is manifested. The VTP monitoring module 113 may capture this decision and the individual adjudicator of the decision.

Figure 2:
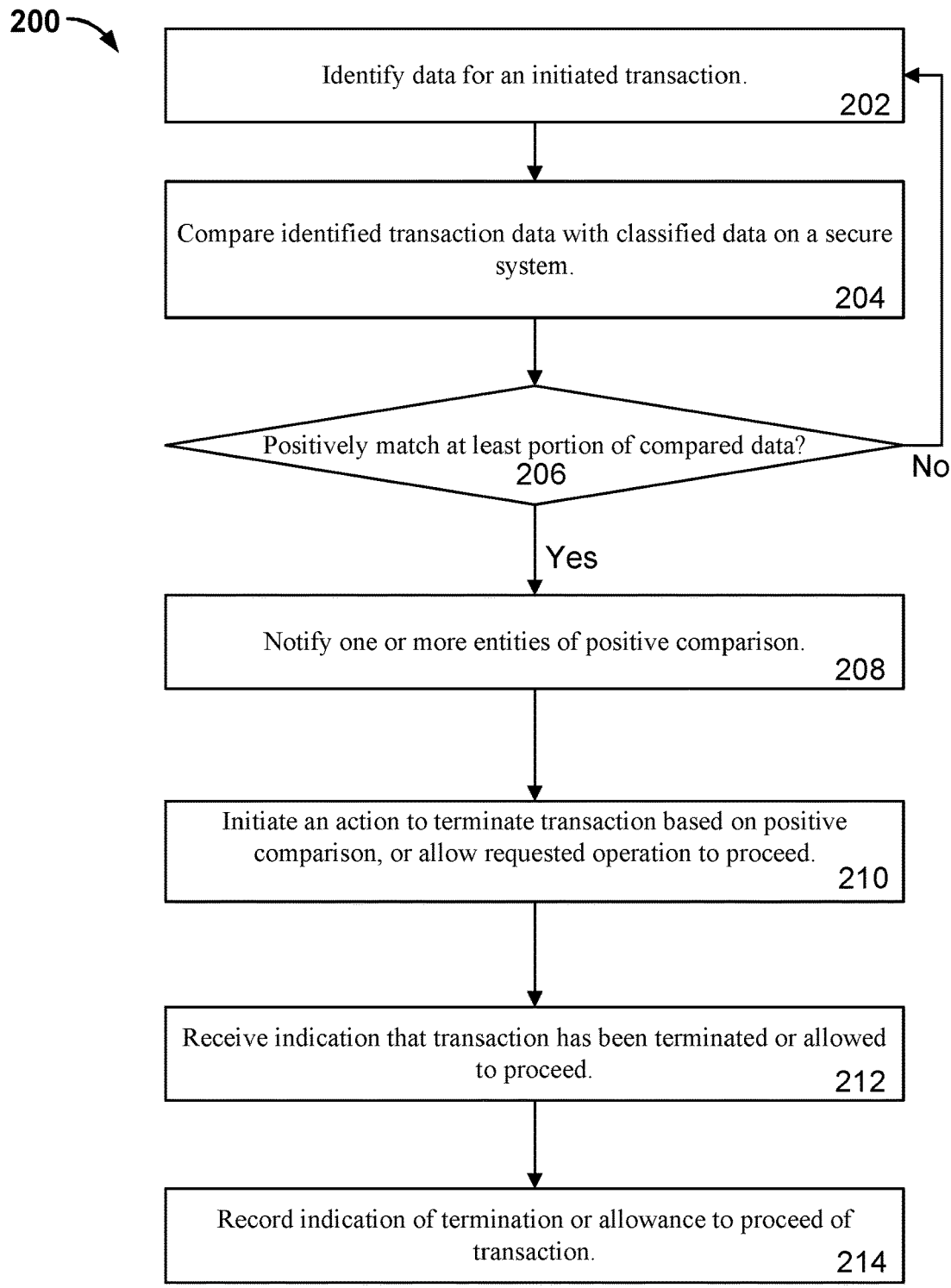
FIG. 2 illustrates an example method for identifying and/or preventing an illicit transaction.

FIG. 2 illustrates an example method 200 for identifying and/or preventing an illicit transaction. In some aspects, method 200 may be implemented on or with the example distributed computing system 100, including the computer-executable VTP monitoring module 113 shown in FIG. 1. For example, one or more of the steps of method 200 may be executed by or with the VTP monitoring module 113 and/or the VTP monitoring plug-in 109 that are communicably coupled between one or more entities 102 and the VTP monitoring system 114 (and the classified database 116) through the network 104. Method 200, although illustrated in FIG. 2 as including particular steps in a particular order, may include the same steps in a different order, may include some steps performed in parallel rather than in series, may include fewer steps than those illustrated, may include more steps than those illustrated, or may include different steps than those illustrated, in accordance with the present disclosure.

Method 200 may begin at step 202, which includes identifying transaction data for an initiated transaction. For example, in some aspects, the VTP monitoring plug-in 109 may proactively capture data (e.g., names, account numbers, identification numbers) associated with an initiated transaction at a particular entity. In some aspects, such data is also captured in the normal course of business, e.g., to process the transaction, check such data against unclassified data for confirmation of a licit transaction, or otherwise. In alternative aspects, a particular entity may send the transaction data, e.g., to the VTP monitoring system 114 and the VTP monitoring module 113, rather than having such information captured (e.g., by the plug-in 109) at the entity. In some aspects, the entity may send the transaction information with a request for the VTP monitoring system 114 to check for a possibility of an illicit transaction.

Method 200 may continue at step 204, which includes comparing identified transaction data with classified data on a secure system. In some aspects, the comparison may occur at the VTP monitoring system 114 or a computing system communicably coupled with the system 114 (e.g., secured by one or more firewalls 118 or otherwise). For instance, in some aspects, the comparison may be performed on a portion of the VTP monitoring system 114 that is secured (e.g., by firewall, authentication rules, and otherwise) between the classified sources 120 and, e.g., the network 104, the entities 102, FinCEN 110, and other portions of the system 100 shown in FIG. 1. The comparison may include, for example, a comparison of, e.g., names, addresses, account numbers, identification numbers, entity names, and entity routing numbers against classified data 117 that includes information (e.g., names, addresses, account numbers, identification numbers, proxies, aliases, and otherwise) associated with persons suspected of criminal or terrorist activities or otherwise. In some aspects, implementation of method (or process) 200 may result in a real-time termination of an illicit transaction based on classified data sources, thereby saving financial resources, preventing the funding of criminal or terrorist activities, and potentially preventing imminent harm.

By facilitating the termination of the transaction in real-time (e.g., prior to completion of the transaction), the VTP monitoring system 114 may provide for a highly automated technical response to the issue of illicit transactions and facilitating a technical and accurate response to such transactions that is currently unavailable. For example, given the vast amount of segregated classified data in multiple classified data sources 120, aggregation of classified data into a classified data database 116 that is part of, controlled by, or communicably coupled (e.g., through a secured connection) to the VTP monitoring system 114 may facilitate such real-time termination of illicit transactions. Previously, such real-time termination would not be possible due to, e.g., the slow response time (i.e., 30-60 days) to SARs that are generated by entities 102. Thus, real-time termination was not possible or feasible. The classified data database 116, in conjunction with the VTP monitoring system 114, therefore, may amount to a specialized computing network to identify and terminate an illicit transaction in real-time completely separate from the routine and conventional SAR process described herein. Alternatively, it may provide a notification to entity personnel to decline the proposed transaction without disclosing the underlying basis which may be classified.

Method 200 may continue at step 206, which includes a determination of whether there is a positive comparison (e.g., match) of at least a portion of the compared data. For example, in some aspects, one or more identifiers of the individual that initiates the transaction may positively compare (e.g., match) a proxy or associate of a known criminal or terrorist.

If there is not a positive comparison (e.g., match) in step 206, method 200 may start over at step 200. In such an instance, in some aspects, the compared data (e.g., the data associated with the initiated transaction and/or the classified data 117) may be deleted, disposed of or otherwise discarded so that such data may not be exposed outside of the VTP monitoring system 114. For example, should virtual copies of the classified data 117 be made to perform the comparison of step 206, such copies would be electronically destroyed. This will mitigate concerns of data security breaches and privacy encroachments. Alternatively, a comparison of the data may be retained for a record of due diligence or system integrity testing.

Further, in some aspects, if there is no positive comparison (e.g., match) in step 206, the security system 102 may notify the entity 102 that no positive comparison (e.g., match) has occurred. The initiated transaction may proceed to completion. In alternative aspects, if there is no positive comparison (e.g., match) in step 206, the security system 102 may notify FinCEN 110 that no positive comparison (e.g., match) has occurred. In alternative aspects, if there is no positive comparison (e.g., match) in step 206, there may be no notification that no positive comparison (e.g., match) has occurred and the initiated transaction may proceed to completion.

If there is a positive comparison (e.g., match) in step 206, method 200 may continue at step 208, which includes notifying one or more of FinCEN, the entity 102, or government agencies (e.g., the classified data sources 120) of the positive comparison (e.g., match) in step 206. For example, in some aspects, the VTP monitoring system 114 may notify FinCEN 110 prior to completion of the initiated transactions. In some instances, the notification may include a portion of the compared data, such as a portion of the data associated with the initiated transaction. In some instances, no portion of the classified data 120 may be communicated to FinCEN 110 or otherwise, but the VTP monitoring system 114 may provide an indication to one or more of the classified data sources 120 that a positive comparison (e.g., match) has occurred. In some aspects, the VTP monitoring system 114 may automatically determine which of the classified data sources 120 supplied the classified data 117 that was matched in step 206, and may notify that particular classified data source 120 (or sources 120) of such a positive comparison (e.g., match) in step 206.

Method 200 may continue at step 210, which includes initiating an action to terminate the transaction based on the positive comparison (e.g., match) in step 206, or allowing the transaction to proceed, for example, in spite of the positive comparison (e.g., match). In some aspects, the VTP monitoring system 114 may initiate an action to terminate the transaction at the entity 102. In some aspects, based on the notification in step 208 from the VTP monitoring system 114 to FinCEN 110, FinCEN 110 may initiate an action to terminate the transaction at the entity 102. In some aspects, the initiation of the termination action may occur in real-time, e.g., prior to completion of the initiated transaction by the entity 102 and in time to stop the initiated transaction. In some aspects, other government agencies, e.g., one or more of the classified data sources 120 or otherwise, may initiate an action to terminate the transaction by notifying the entity 102 based on the positive comparison (e.g., match) in step 206. In some aspects, the VTP monitoring system 114 may terminate the transaction by integrating with the entity 102 (e.g., through existing financial software or systems at the entity 102) based on the positive comparison in step 206.

In some aspects, the transaction may be allowed to proceed in spite of a positive comparison (e.g., match), e.g., based on a decision by the VTP monitoring system 114, FinCEN 110, a classified data source 120, or otherwise. For example, in some aspects, FinCEN 110 may determine that the positive comparison (e.g., match) does not rise to an appropriate level of concern (e.g., a YELLOW alert but not a RED alert) to warrant discontinuance of the transaction. As another example, FinCEN 110 may determine that the transaction is an illicit transaction based on the positive comparison (e.g., match) (e.g., a YELLOW or RED alert) yet allow it to proceed in order to, e.g., develop further information on the parties involved in the transaction, as well as the breadth and scope of the illicit scheme.

Method 200 may continue at step 212, which includes receiving an indication that the transaction has been terminated or allowed to proceed. For example, in aspects in which FinCEN 110, one or more classified data sources 120, or other government agencies that are informed of the positive comparison (e.g., match), terminate the transaction or notify entity 102 personnel to do the same, or allow the transaction to proceed, an indication of this decision may be received at the VTP monitoring system 114.

Method 200 may continue at step 214, which includes recording an indication of the termination, or an allowance to proceed, of the transaction. For example, the VTP monitoring system 114 may save or record the matched data, the government agency individual that made the decision to terminate or allow (e.g., FinCEN 110 or otherwise), an individual or individuals that made the decision, and other information as appropriate.

A number of embodiments have been described. Nevertheless, it will be understood that various modifications may be made without departing from the spirit and scope of what is described. Accordingly, other embodiments are within the scope of the following claims.

What is claimed is:

1. A search and retrieval data processing system for retrieving classified data for execution against a cyber-security logic rules, comprising:
   one or more hardware processors and memory, networked to communicably couple through a secure connection to a classified data database, the classified data database comprising an aggregated plurality of classified data records captured from a plurality of classified data sources that are controlled to provide access only to those in lawful possession of the classified data and that are controlled to prevent access by the general public; and
   the memory in communication with the processor, the memory storing an execution environment, the execution environment comprising:
      an input port for receiving, from an entity with which a transaction initiator has initiated transactions related to financial data, data associated with one or more comparisons related to the initiated transactions related to financial data, wherein the data associated with the one or more comparisons includes a unique identifier of a proposed value sender, a unique identifier of a proposed value receiver, or a transaction identifier associated with the transaction initiator; and
      a logic execution module for:
         determining, based at least on executing a set of cyber-security logic rules against the received data associated with the one or more initiated transactions related to financial data and one or more of the classified data records, that a positive comparison exists between the unique identifier of the proposed value sender, the unique identifier of the proposed value receiver, or the transaction identifier associated with the transaction initiator that was included in the received data associated with the one or more initiated transactions related to financial data and one or more unique identifiers that are included in the one or more of the classified data records; and
         based on determining that a positive comparison exists between the unique identifier of the proposed value sender, the unique identifier of the proposed value receiver, or the transaction identifier associated with the transaction initiator that was included in the received data associated with the one or more initiated transactions related to financial data and the one or more unique identifiers that are included in the one or more classified data records, writing to memory one or more instructions for initiation of one or more termination actions relating to the one or more initiated transactions related to financial data.

2. The search and retrieval data processing system of claim 1, wherein the logic execution module is further for:
   integrating with a system of the entity that provides the received data associated with one or more transactions related to financial data; and
   retrieving the data associated with the one or more initiated transactions related to financial data from the system.

3. The search and retrieval data processing system of claim 2, wherein the logic execution module is further for terminating the one or more initiated transactions related to financial data through the system of the entity.

4. The search and retrieval data processing system of claim 3, wherein the logic execution module is further for transmitting a notification to the entity associated with the one or more initiated transactions related to financial data to terminate the one or more initiated transactions.

5. The search and retrieval data processing system of claim 1, wherein the logic execution module is further for notifying one or more government agencies that are associated with the classified data.

6. The search and retrieval data processing system of claim 5, wherein the logic execution module is further for:
   based on the notification to the one or more of the government agencies that are associated with the classified data, enabling an action of the one or more agencies associated with the classified data to override any protocol of notification to the entity with a record of an individual that adjudicates the override.

7. The search and retrieval data processing system of claim 1, wherein the one or more termination actions comprises at least one of a cancelation of the one or more initiated transactions related to financial data prior to completion of the one or more initiated transactions related to financial transactions, or a warning about the one or more initiated transactions related to financial data prior to completion of the one or more initiated transactions related to financial data.

8. The search and retrieval data processing system of claim 1, wherein the logic execution module is further for transmitting a message to a government agency regarding the positive comparison, and the message to the government agency comprises at least one of the received data or the classified data, or a uniquely identifiable encrypted comparison.

9. The search and retrieval data processing system of claim 1, wherein the logic execution module is further for comparing an encrypted version of the received data and an encrypted version of the classified data.

10. The search and retrieval data processing system of claim 1, wherein the entity comprises a financial intelligence unit, a financial institution, a Designated Non-Financial or Professional Business (DNFBP), or another financial conducting business entity.

11. The search and retrieval data processing system of claim 1, wherein the one or more initiated transactions related to financial data comprises at least one of an onboarding, a wire transfer, value or funds transfer, e-cash, ongoing client vetting or due diligence, purchase of a stored value or pre-paid card, or a transfer of other forms of digital or virtual modes of currency.

12. The search and retrieval data processing system of claim 1, wherein the unique identifier of the proposed value sender, the unique identifier of the proposed value receiver, or the transaction identifier associated with the transaction initiator comprises one or more of a name, account number, routing number, Internet protocol (IP) Address, or other identifying data of a value or funds individual sender, individual receiver, associated organization or entity.

13. The search and retrieval data processing system of claim 1, wherein the classified data comprises one or more of: a name of a terrorist or criminal, a proxy for a terrorist or criminal, one or more associates of a terrorist or criminal, financial or other data associated with a terrorist or criminal or any derivative pseudonym of a terrorist or criminal, or financial or other data associated with a terrorist organization or criminal organization or any derivative pseudonym of a terrorist organization or a criminal organization.

14. The search and retrieval data processing system of claim 1, wherein the logic execution module is further for:
identifying data associated with another transaction related to financial data at the entity;
comparing the identified data associated with the another transaction related to financial data to classified data stored in the secured classified database; and
based on a negative comparison between the identified data of the another initiated transaction related to financial data to the classified data, initiating an action to purge or delete at least one of the identified data or the classified data.

15. The search and retrieval data processing system of claim 14, wherein the logic execution module is further for:
based on a negative comparison between the identified data of the another initiated transaction related to financial data to the classified data, performing at least one of storing a result of the comparison of the identified data of the another initiated transaction related to financial data and the classified data, or erasing the received data subsequent to the negative comparison.

16. The search and retrieval data processing system of claim 1, wherein the logic execution module is further for:
updating the classified database based on a change to data stored in one or more classified data sources.

17. The search and retrieval data processing system of claim 1, wherein the logic execution module is further for:
receiving an override message from a government agency to discontinue the termination action of the one or more initiated transactions related to financial data;
receiving an identification of an adjudicator of the override message.

18. The search and retrieval data processing system of claim 1, wherein the logic execution module is further for creating a secured unclassified database that comprises the received data from the entity.

19. The search and retrieval data processing system of claim 18, wherein the logic execution module is further for:
aggregating received data associated with a plurality of initiated transactions related to financial data;
comparing the aggregated received data to the classified data stored in the secure classified database; and
based on one or more positive comparisons between the aggregated received data and the classified data, determining one or more trends or typologies of illicit activity.

20. The search and retrieval data processing system of claim 18, wherein the secured unclassified database comprises received data from a system of the entity, and the logic execution module is further for:
creating a second secured unclassified database with received data independent of the system of the entity for comparison to the classified data.

21. The search and retrieval data processing system of claim 1, wherein the logic execution module is further for:
creating the secured classified database with the classified data sourced from a plurality of classified data sources, each classified data source associated with a particular government agency, and the secured classified database comprises a plurality of separately maintained data stores, each data store corresponding to a particular government agency.

22. The search and retrieval data processing system of claim 1, wherein the logic execution module is further for:
defining a plurality of categories based on a gravity of predicted harm or threat to public safety as a result of a completion of the one or more initiated transactions related to financial data.

23. The search and retrieval data processing system of claim 22, wherein the logic execution module is further for:
determining, based on a positive comparison, that the one or more initiated transactions related to financial data falls within a first category; and
based on the determination, performing at least one action comprising:
terminating the one or more initiated transactions related to financial data through integration with a system of the entity;
notifying only the entity to terminate the one or more initiated transactions related to the financial data;
notifying only one or more government agencies; or
notifying both the entity and the one or more government agencies.

24. The search and retrieval data processing system of claim 23, wherein the logic execution module is further for:
determining, based on a positive comparison, that the one or more initiated transactions related to financial data falls within a second category; and
based on the determination, performing at least one action comprising:
notifying only the entity to terminate the one or more initiated transactions related to financial data;
notifying only one or more government agencies;
notifying both the entity and the one or more government agencies.

25. The search and retrieval data processing system of claim 24, wherein the logic execution module is further for:
determining, based on a negative comparison, that the one or more initiated transactions related to financial data falls within a third category; and
based on the determination, performing at least one action comprising:
storing a record of submission of the received data for the one or more initiated transactions related to financial data for comparison;
maintaining the compared data for further comparison at a later time period; or
purging the compared data of the one or more initiated transactions related to financial data from memory.

26. The search and retrieval data processing system of claim 23, wherein the logic execution module is further for:
receiving, from the one or more government agencies, indication to override initiation to terminate the one or more initiated transactions related to financial data; and
recording the decision to override initiation to terminate the one or more initiated transactions related to financial data and an identifier of an adjudicator at the one or more government agencies that provided the override.

\* \* \* \* \*